United States Patent [19]

Aldemaro et al.

[11] 4,321,188

[45] Mar. 23, 1982

[54] PROCESS FOR PRODUCING SYNTHETIC FLAME RESISTING POLYAMIDES, FLAME RESISTING FILAMENTS AND FIBRES AND PRODUCTS OBTAINED BY USING THE SAME

[75] Inventors: Ciaperoni Aldemaro, Bollate; Cappelli Alberto, Cogliate, both of Italy

[73] Assignee: Snia Viscosa Societa Nazionale Industria Applicazioni Viscosa s.p.a., Milan, Italy

[21] Appl. No.: 109,398

[22] Filed: Jan. 3, 1980

[30] Foreign Application Priority Data

Jan. 5, 1979 [IT] Italy .............................. 19081 A/79

[51] Int. Cl.³ .................................................. C08K 5/34
[52] U.S. Cl. .................................... 524/720; 528/314; 528/323
[58] Field of Search .................... 260/37 N, 45.8 NT; 528/314, 323, 336

[56] References Cited

U.S. PATENT DOCUMENTS

| | | | |
|---|---|---|---|
| 2,205,722 | 6/1940 | Graves | 260/37 N |
| 2,820,770 | 1/1958 | Adams | 528/323 |
| 3,039,990 | 6/1962 | Huffman | 528/323 |
| 3,065,208 | 11/1962 | Papero, Jr. et al. | 528/315 |
| 3,148,170 | 9/1964 | Notarbartolo et al. | 260/45.75 R |
| 3,386,967 | 6/1968 | Twilley | 528/323 |
| 4,060,518 | 11/1977 | Jeserich et al. | 528/314 |
| 4,061,708 | 12/1977 | Lazarus | 528/314 |
| 4,180,496 | 12/1979 | Yanagimoto et al. | 260/45.8 NT |

Primary Examiner—John Kight, III
Assistant Examiner—R. A. White
Attorney, Agent, or Firm—Wenderoth, Lind & Ponack

[57] ABSTRACT

A method for producing flame resistant synthetic polyamides, suitable for spinning is described, wherein melamine and isocyanuric acid are reacted in an aqueous environment at the melamine isocyanurate formation temperature. An aqueous suspension of melamine isocyanurate is obtained having a maximum granule size not exceeding 2 microns, substantially free from agglomerates. The suspension is admixed with the monomeric material and the whole is submitted to polymerization. The invention provides a successful method for obtaining flame-resisting polyamide fibers and yarns owing to the presence therein of the melamine isocyanurate additive.

16 Claims, No Drawings

PROCESS FOR PRODUCING SYNTHETIC FLAME RESISTING POLYAMIDES, FLAME RESISTING FILAMENTS AND FIBRES AND PRODUCTS OBTAINED BY USING THE SAME

BACKGROUND OF THE INVENTION (a) The Field of the Invention

This invention relates to the production of synthetic polyamide filaments and fibers having high flame-resisting properties.

(b) The Prior Art

It is known how to confer flame-resistance to textile materials in general by introducing additives therein, such as nitrogenous compounds, phosphorus compounds, etc. A class of additives utilized are the derivatives, e.g. the salts, of melamine (triaminotriazine), and among these salts, the salt of isocyanuric acid (trioxytriazine) is included.

Czechoslovakian Pat. No. 127,854 discloses a method for making textile materials flame-resistant by impregnation with condensation products of various derivatives of s-triazine, in particular melamine isocyanurate. However, that process has considerable shortcomings, and in particular it not only requires a laborious finishing treatment, but the flame-resisting effect to be obtained is inadequate and insufficiently stable through the life of the manufactured article, especially with regard to the washing to which it will be subjected, as necessary. It would be conceivable to add the flame-retarding additive to the molten polyamide, but since the former is insoluble in the latter, it is impossible to achieve a homogeneous clot-free dispersion, as a polymer suitable for spinning would require.

Thus, still unknown in the art are successful methods for obtaining fibers and yarns which have flame-resisting properties due to the presence therein of the derivatives of s-triazine according to the cited Czechoslovakian patent.

SUMMARY OF THE INVENTION

The invention solves the problem of providing such a method and afforst the possibility of producing novel flame-resisting polyamide fibers and yarns, owing to the presence therein of the above-mentioned additives, in particular of the reaction product of isocyanuric acid and melamine.

The method is characterized in that melamine and cyanuric acid are reacted in an aqueous environment at formation temperatures of melamine isocyanurate, thereby obtaining an aqueous suspension of melamine isocyanurate having a maximum granule size not exceeding 2 microns and substantially free from agglomerates of granules having a maximum size substantially exceeding 2 microns; that said suspension is admixed with the monomeric material; and that the whole is submitted to polymerization conditions. The mixing with to the monomeric material may be carried out either before or after reacting the melamine with the isocyanuric acid; the mixing may also be carried out partly before and partly after the reaction wherein the isocyanurate is formed in the presence of part, but not the entire amount, of the monomer.

The resulting polyamide may be, for example, polycapronamide (nylon 6) or poly(hexamethylenediamine adipate) (nylon 66). The terms "monomeric material" and "monomer" do not rule out the presence of oligomers. The polymerization technique may either be a standard one or inclue variations. Thus, in the case of caprolactam, it may be polymerized in the presence of water and at autogenous pressure in the hydrolysis phase, then offgassing and polymerizing under partial vacuum in the presence, or absence, of molecular weight adjusters. According to another technique for polymerizing caprolactam, which adapts itself equally well to the presence of the melamine isocyanurate additive, one operates in the presence of such reaction promoters as aminoacids or diacid-diamine salts or others, as is well known in the art. In the presence of such promoting agents, it becomes possible to polymerize even at zero pressure and in the presence of molecular weight adjusters.

Desirably, the polymerization is carried out immediately after the formation of the isocyanurate at a later moment. Quite often, and in the preferred and most important cases, the monomeric material is an aqueous solution of the monomer; however, the water from the isocyanurate suspension and the monomer added thereto may be sufficient, or alternatively the added part of monomer could be substantially anhydrous.

Where the monomer is caprolactam, the ratio water/caprolactam by weight of the isocyanurate-containing monomeric solution is in the 0.01 to 0.99 range, preferably in the 0.05-0.5 range; melamine isocyanurate is present in said solution in the range from 1% to 50% by weight, preferably 5–10%. The temperature whereat salification takes place ranges between 20° C. and 220° C., preferably between 70° C. and 180° C. To form isocyanurate, isocyanuric acid and melamine react in equimolecular amounts; naturally, however, there could be an excess of either, although this would be undesirable.

In general, in the pertinent art, the trend is towards avoiding the introduction of foreign substances within the monomers to be polymerized because it is feared that they might adversely affect the polymerization, acting for example as chain terminators or developing a degrading action on the polymer such as to prevent the desired final viscosity from being reached. In the instance of melamine, it is known that its reaction products with acids have such adverse influence. Quite surprisingly, in the process according to the invention, no adverse effect is encountered and the polymerization occurs regularly, as in the absence of isocyanuric acid and melamine. Furthermore, the reaction products of these two components are suspended in the polymerization mixture with such a fine granule size, generally 0.5–2.0 microns, as to allow the subsequent spinning by fusion of the resulting polymer, either directly in the autoclave or through the reduction thereof to chips or other convenient particles.

In a preferred embodiment of the invention, it may be desirable to maintain the melamine isocyanurate suspension even more stable by the addition of commercially available dispersants, such as polyethylene glycol, phosphorate derivatives (Calgon), and the like. They may be conveniently added together with the melamine and isocyanuric acid reactants.

The relative viscosity of the resulting final polymer ranges between 1.9 and 3.2. The relative viscosity of the polymer suitable for textile applications ranges, preferably from 2.1 to 2.8, whereas the relative viscosities of the fibers or yarns, which are known to be slightly smaller than the polymer viscosity, range from 2.0 to 2.7. Such relative viscosities are measured in 90% sulphuric acid, with a 1% concentration, at the temperature of 20° C.

DETAILED DESCRIPTION OF THE PREFERRED EMBODIMENTS

EXAMPLE 1

Dispersion of melamine isocyanurate in the polymerization medium, yielding fiber, and inflammability test thereof In a 30-liter capacity autoclave equipped with a stirrer, there ae added in a nitrogen stream 2.460 kg of caprolactam and 1.052 kg water; under agitation, 0.237 kg melamine and 0.242 kg isocyanuric acid are further added. The vessel temperature is raised to 90°–95° C. and the mass is maintained at that temperature for 210 minutes; then, without discontinuing the stirring, and under a nitrogen stream, there is introduced into the autoclave a mixture comprising: 4.910 kg caprolactam, 150.4 g hexamethylenediamine adipate salt, 18.6 g (aqueous 75% solution) of hexamethylenediamine.

Now, the composition of the mixture is the following: the ratio by weight of water caprolactam is 0.14, the melamine isocyanurate concentration by weight versus caprolactam is 6.5%, the concentration by weight of hexamethylenediamine adipate versus caprolactam is 2.04%, the concentration by weight of hexamethylenediamine versus caprolactam is 0.019%.

The autoclave temperature is gradually raised to 235° C., but providing for the pressure inside the vessel not to exceed the atmospheric pressure during the temperature increase. The temperature is maintained at 235° C. for 210 minutes at an absolute pressure of 1.2 to 1.3 atmospheres. Then, a gradual decrease of the pressure is initiated, at a rate of 100 mmHg every 30 minutes. As the residual pressure inside the autoclave reaches 260 mmHg, the stirring is discontinued and with a nitrogen flow the pressure is returned to a level suitable for resulting in a correct extrusion of the polymer.

The polymer, as reduced to chips, is extracted with water at 95° C. for 8 hours and dried. The values of the analysis determinartions are as follows:

$\eta_r$ (measured as described above)=2.37
Terminal amino groups=50 equivalents/$10^6$ g
N%=14.5.

An 80 kg amount of the polymer produced as described is spun to a count of 44 dtex, with circular cross-section; the head temperature is 245° C. and the spinning rate or speed is 750 m/min. The pressure on the spinning head filter was 83 atmospheres and constant.

A portion of the yarn is cold drawn (at a K=3.20 draw ratio), to achieve the following textile characteristics: tenacity 3.0 g/den, elongation 39.5%; the remaining portion is instead drawn at 65° C. and K=3.35. The tenacity and elongation are respectively 2.8 g/den and 31.6%; in general, the drawing operation exhibited no problems. By varying the draw ratios, it becomes possible to attain a wide range for the tenacity and elongation values respectively ranging from 2.5 to 3.5 g/den and 27 to 45%. A section of the yarn under a microscope shows no presence of clots or agglomerates of the melamine isocyanurate additive, while in the original polymer the dispersion was homogeneous, with particles not exceeding 1 micron in diameter.

On a stocking article specimen, as knitted with the yarn obtained as mentioned above, a measurement of the oxygen value (index) is carried out: exceeding 27%. A conventional nylon 6 yarn stocking article having the same count exhibits an oxygen value of 22–24%. Moreover, to better evaluate the flame-retarding effect of the homogeneously dispersed melamine isocyanurate additive, an ignition test has been carried oiut on a strand 50 cm in length and having an overall count of 2000; the strand formed from the yarn of this example required 20 ignitions to burn completely, whereas the reference strand of standard nylon 6 required 3 ignitions.

EXAMPLE 2

This example illustrates a modification of the process of Example 1. The same amounts indicated in Example 1 are added once while stirring and in a nitrogen stream, in a 30-liter autoclave; by following the same procedure as in Example 1, a polymer is obtained, the melamine isocyanurate dispersion of which is as homogeneous and fine as the one exhibited on the optical microscope by the polymer of Example 1.

EXAMPLE 3

This example illustrates the application of the method according to this invention to polymerization of hexamethylenediamine adipate. In a 2-liter autoclave, an aqueous solution of 600 g hexamethylenediamine adipate in 1000 g water, under agitation and in a nitrogen stream, is mixed with 24.2 g melamine and 24 g isocyanuric acid. The mixture is stirred for 2 hours at 110° C., thereafter the temperature is raised to 240° C., slowly in order to distill off the water excess. It is maintained for two hours at 240° C., still under agitation, at an absolute pressure of 5 atmospheres; it is then degassed slowly down to atmospheric pressure, the temperature is raised to 250° C., and is maintained under a nitrogen stream for 3 hours. The resulting polymer having a viscosity of 2.1 exhibits a homogeneous dispersion of the additive.

EXAMPLE 4

This example does not illustrate the invention, but it is a comparative example which illustrates the inferior results which are obtained with a conventional process, not using the present invention.

On a Cresout-Loire extruded machine, 121.5 kg chips of nylon 6 (relative viscosity 2.6 as measured similarly to the preceding examples) are extruded together with 6.1 kg melamine isocyanurate, as obtained by salification in water at 90° C. of melamine with isocyanuric acid. The extruded mixture (125 kg) is transferred to a spinning line to yield a 44 dtex yarn of circular cross-section; the temperature of the die head is in the 235° to 240° C. range, the take up speed is 680 m/min. After 25 kg have been spun, the pressure at the die head has increased from the original 60 atmospheres to 240 atmospheres, and the resulting yarn could not be drawn due to numerous flash formations. The spinning test was repeated on part of the amount left over, but again, clogging of the die head filter packs occurred.

Some polymer chips have been dissected and analyzed on the optical microscope; additive clots 70 to 150 microns in length can be observed. Such aggregates are responsible for the occlusion of the die head filter packs, without allowing the entire available amount to be spun.

I claim:

1. A method of producing a flame-resistant synthetic polyamide, suitable for spinning, which comprises reacting melamine with isocyanuric acid in an aqueous environment and in at least a portion of the total amount of monomer to be polymerized, at a temperature suitable for the formation of melamine isocyanurate, thereby obtaining an aqueous suspension of melamine isocyanurate having a maximum granule size not exceeding 2 microns and being substantially free from agglomerates of granules having a maximum size substantially exceeding 2 microns; mixing the remainder, if any, of the monomer to be polymerized, with said aqueous suspension; and subjecting the resultant mixture to polymerization conditions.

2. A method according to claim 1, characterized in that the reaction of the melamine with the isocyanuric acid takes place in the presence of the entire amount of the monomer to be polymerized.

3. A method according to claim 1, characterized in that the reaction of the melamine with the isocyanuric acid takes place in the presence of a portion of the total amount of the monomer to be polymerized.

4. A method according to claim 1, characterized in that the monomer is an aqueous solution of the monomer.

5. A method according to claim 1, characterized in that the monomer is caprolactam.

6. A method according to claim 1, characterized in that the melamine and isocyanuric acid are reacted in equimolecular proportions.

7. A method according to claim 5, characterized in that the mixture to be subjected to polymerization conditions contains water and caprolactam in a water/caprolactam weight ratio of from 0.01 to 0.99, and contains melamine isocyanurate in an amount from 1 to 50% by weight of the mixture.

8. A method according to claim 7, characterized in that the water/caprolactam ratio is from 0.05 to 0.5, and the amount of melamine isocyanurate is from 5 to 10%.

9. A method according to claim 7, characterized in that the formation temperature of the isocyanurate is from 20° to 220° C.

10. A method according to claim 5, characterized in that the caprolactam is polymerized first in the presence of water under autogenous pressure and then by off-gassing and polymerizing under partial vacuum.

11. A method according to claim 5, characterized in that the caprolactam is polymerized in the presence of a reaction promoter which promotes polymerization.

12. A method according to claim 11, characterized in that the reaction promoter is selected from the group consisting of aminoacids and diacid-diamine salts.

13. A method according to claim 5, characterized in that the polymerization is continued until a relative viscosity in the 2.1 to 2.8 range is achieved for the final polymer.

14. A method according to claim 9, characterized in that said temperature is from 70° to 180° C.

15. A method according to claim 1, characterized in that the melamine isocyanurate suspension contains a dispersant which maintains the stability of said suspension.

16. A method of producing flame-resistant filaments or fibers, which comprises spinning, in the molten state, the polyamide obtained in accordance with claim 1, to form filaments or fibers.

* * * * *